(12) United States Patent
Delattre et al.

(10) Patent No.: US 7,570,602 B2
(45) Date of Patent: Aug. 4, 2009

(54) METHOD OF ROUTING IN AN AD HOC NETWORK

(75) Inventors: Michel Delattre, Boulogne (FR); François Paul, Motigny les Cormeilles (FR)

(73) Assignee: Thales, Neuilly sur Seine (FR)

( * ) Notice: Subject to any disclaimer, the term of this patent is extended or adjusted under 35 U.S.C. 154(b) by 804 days.

(21) Appl. No.: 11/108,911

(22) Filed: Apr. 19, 2005

(65) Prior Publication Data

US 2006/0002312 A1 Jan. 5, 2006

(30) Foreign Application Priority Data

Apr. 20, 2004 (FR) .................................. 04 04143

(51) Int. Cl.
*H04L 12/28* (2006.01)
(52) U.S. Cl. ....................................................... 370/254
(58) Field of Classification Search ................. 370/254, 370/255, 256
See application file for complete search history.

(56) References Cited

U.S. PATENT DOCUMENTS

| | | | |
|---|---|---|---|
| 6,101,170 A * | 8/2000 | Doherty et al. ............. 370/255 |
| 6,628,620 B1 * | 9/2003 | Cain ........................... 370/248 |
| 2003/0151513 A1 * | 8/2003 | Herrmann et al. ......... 340/573.1 |
| 2003/0202468 A1 * | 10/2003 | Cain et al. .................. 370/229 |
| 2003/0202476 A1 | 10/2003 | Billhartz et al. |
| 2003/0204616 A1 | 10/2003 | Billhartz et al. |

FOREIGN PATENT DOCUMENTS

| | | |
|---|---|---|
| EP | 1 289 201 | 3/2003 |
| EP | 1 376 939 | 1/2004 |

* cited by examiner

*Primary Examiner*—Chirag G Shah
*Assistant Examiner*—Ashley L Shivers
(74) *Attorney, Agent, or Firm*—Lowe Hauptman Ham & Berner, LLP

(57) ABSTRACT

A method for the routing of information in a network comprises several communication nodes that may be mobile, the routing being done by a route between a source node and a destination node through a set of wireless communication links between the nodes of the network, the entire set forming a graph wherein the method comprises at least one step in which the graph of the network is structured as a unicast two-way link in order to obtain the relationships existing between two nodes and form, during routing decisions, subgraphs comprising arcs that connect two nodes, the arcs sharing one and the same set of properties.

15 Claims, 3 Drawing Sheets

1 - Mobile nodes
2 - radio Links, eg: TDMA slot
3 - Logic Links A-B, B-C, B-D
3a - Logic Links of the graph a
3b - Logic Links of the graph b 1-Ingress mobile nodes
2-Egress mobile node D
3-Dynamic route to D in the virtual network a
4-Static route with reservation of source A toward D

METHOD OF ROUTING IN AN AD HOC NETWORK

RELATED APPLICATIONS

The present application is based on, and claims priority from French Application Number 04 04143, filed Apr. 20, 2004, the disclosure of which is hereby incorporated by reference herein in its entirety.

BACKGROUND OF THE INVENTION

1. Field of the Invention

The invention relates to a method of routing in an ad hoc network that differentiates critical applications and optimizes resources according to the expected quality of service.

The flow of multimedia streams through an ad hoc network comprising mobile nodes interconnected by radio means leads to the selection and maintenance of routes that are compatible with end-to-end quality of service despite variations in topology that are difficult to predict.

The networks concerned are, for example, extensive networks used to convey voice and data services without having to rely on a rigid structure up to the capillary level. The resources needed for the flow of these streams as well as the signaling systems (resource management and routing systems) must be minimized and used as a priority for operationally important services such as telephony services or emergency messaging.

2. Description of the Prior Art

In the field of ad hoc network routing and extensions for QoS, the prior art deals with the following goals:

providing the best route, namely the shortest route in number of hops, and minimizing the exchanges of routing signals. These methods, however, are not sufficient to meet the needs of multimedia communications. Quality of service is not taken into account.

discovering the routes that respond to quality of service (QoS) criteria. The methods associated do not enable the efficient processing of the route requests in extensive networks, because they limit themselves to proposing exceptional QoS processing mechanisms, whence a loss of efficiency of the basic routing protocol.

offering a routing algorithm that takes account of the quality of service QoS by which it is possible to control the volume of signaling packets, even when the size of the network grows. These methods have the flaw wherein they introduce a narrow coupling between bandwidth reservation and routing, which means that it is not possible to simply process all the QoS elements in a radio network. Most of these elements, namely the error rate, the safety level, the level of consumable energy, the jitter and the time lag have no relation with bandwidth reservation or with the criteria of the emergency requests.

taking account of the longevity of the routes, the energy consumed during relaying operations or any other criterion. These methods are optimized according to one metric alone, and this does not provide a comprehensive solution.

partitioning a network into Virtual Service Networks (VSN) using predetermined characteristics. These methods are not directly applicable to an ad hoc radio network in which the capacities of the links are variable as a function of random factors related to propagation and position of the nodes.

modeling the ad hoc network in terms of hyperlinks and taking account of the states of mobile nodes. These methods are not directly applicable to a very extensive network that emphasizes multiple multipoint links, access techniques (e.g.: TDMA) or adaptive antennas.

In short, the prior art describes many techniques that tend to support multimedia communications in radio networks using ad hoc organization, but the metric multiples to be taken into account are such that the problem to be resolved remains without any satisfactory solution, in terms of both service rendered and optimization of means.

SUMMARY OF THE INVENTION

The invention relates to a method for the routing of information in a network comprising several communication nodes that may be mobile, the routing being done on a route between a source node and a destination node through a set of wireless communication links between the nodes of the network, the entire set forming a graph. The invention is characterized in that it comprises at least one step in which the graph of the network is structured as a two-way unicast link (bi-directional point to point link) in order to obtain the relations existing between two nodes and, during routing decisions, forming sub-graphs comprising arcs linking two nodes, the arcs sharing a same set of properties.

The routing mechanism is of the "on demand" type and, during the phase of searching for a route, comprises at least the following step: the route requests are propagated only on links belonging to the sub-graph having the properties requested by the application that has made a call on the routing method.

The routing method of the invention offers especially the following advantages:

It enables differentiated routing that takes account of both performance for quality of service QoS and levels of operational importance, It segments the ad hoc network into specialized virtual networks with highly dynamic topology sharing a same radio connectivity, It optimizes the resources consumed and eliminates streams having constraints that the node of mobile networks cannot meet as early as possible, It supports a reservation of resources that adapts not only to demand, but also to variation in performance due to the mobility of the nodes and random factors of propagation.

the predictability of the "find a route" service is directly a function of the operational importance of the request:

the critical applications are therefore better served, they benefit from the fact that the requests are made mutual, thus smoothing out fluctuations of capacity due to radio transmissions and to ad hoc mobility.

The level of resources consumed by routing and resource management signals to ensure quality of service is adapted as closely as possible to the operational importance of the requests:

the total efficiency of the system is improved, the optimizing level can be parametrized, the quality of service parameters, which are of vital importance in a multi-hop radio system—for example the end-to-end error rate—come into play in the choice of the routes and the application of resource reservation:

the method adopted is differentiated from the usual QoS methods by inadequate reservations of bit rate for all the QoS parameters insensitive to these levels of reservation, the types of radio modulation may be selected dynamically by virtual network for greater spectral efficiency.

BRIEF DESCRIPTION OF THE DRAWINGS

Other features and advantages of the invention shall appear more clearly from the following description of an exemplary embodiment given by way of an illustration that in no way restricts the scope of the invention, and from the following figures, of which.

MORE DETAILED DESCRIPTION

Thus, for a clearer understanding of the principle implemented in the method according to the invention, the following example is given by way of an illustration for an ad hoc radio network comprising several mobile nodes interconnected by multicast radio means. The invention seeks especially to set up a route between a source node and a destination node through a set of wireless communications links between the nodes of the network.

In an ad hoc network, the topology of the network may change at any time, since the dynamics are unforeseeable. The characteristics of an ad hoc network are: a dynamic topology, limited bandwidth, energy constraints, limited physical security and an absence of infrastructure.

The method according to the invention can be implemented in the form of a computer program. It may take the form of hardware, or again it may be a software program. FIGS. 2 to 5 represent graphs of data streams exchanged between all the network nodes. A network node is a hardware device driven by software agents, showing functional autonomy and working in co-operation with the other nodes of the network to form communications services for the applications at the periphery of this network. The blocks shown and the links between the blocks may be implemented by software instructions. These instructions may be executed by a processor or any other equivalent means.

Figure 1:
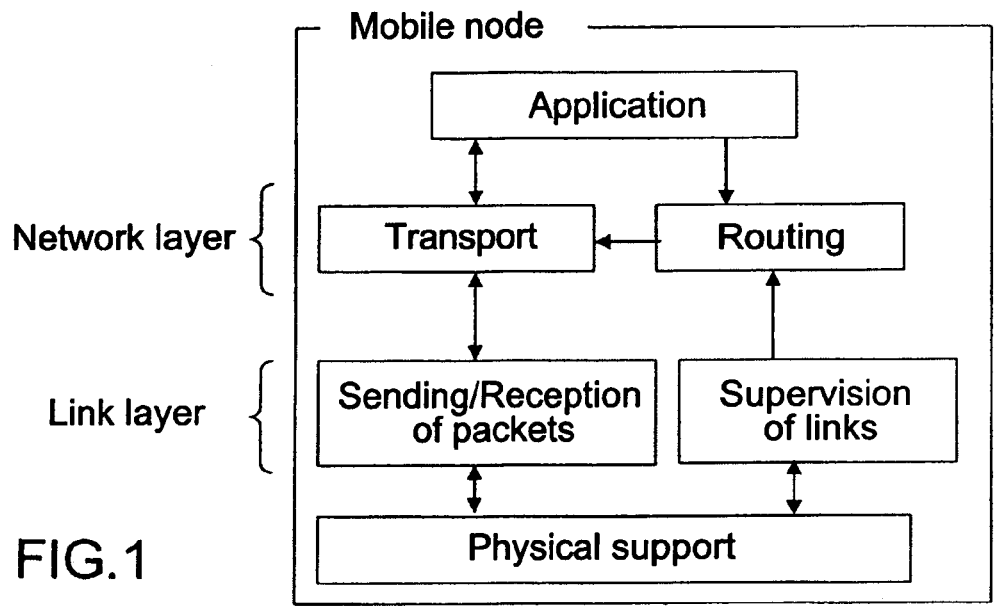
FIG. 1 shows the composition of a mobile node for the method according to the invention, FIG. 2 exemplifies a network and graph set up according to the steps of the method.

The present description makes the assumption that a mobile node typically comprises the following entities, described with reference to FIG. 1:

An entity known as an "application" entity which, in the present description, represents any entity liable to act upon the routing entity so that it determines a route appropriate to the transporting of data. This is the data that the application entity subsequently submits to the "transport" entity so that it is conveyed from mobile node to mobile node up to the addressee or destination application entity.

A routing entity, responsible for determining the appropriate routes. This routing entity uses the method that is the object of the present invention. Once the routes are determined, they are communicated to the transport entity.

A transport entity. When the appropriate route has been determined by the routing entity, the application data packets are conveyed from mobile node to mobile node by the transport entities in following the routes.

A link supervision entity. On a given mobile node, the link supervision entity determines which are the neighboring nodes and the available characteristics of the communications resources enabling the exchange of packets with the neighboring nodes.

A pack transmission/reception entity to exchange packets with the neighboring nodes.

A "physical" entity consisting of the means of access to the physical support (typically, this physical layer assembles the mechanisms of modulation/demodulation, encoding, synchronization, etc. for access to the radio channel).

Figure 2:
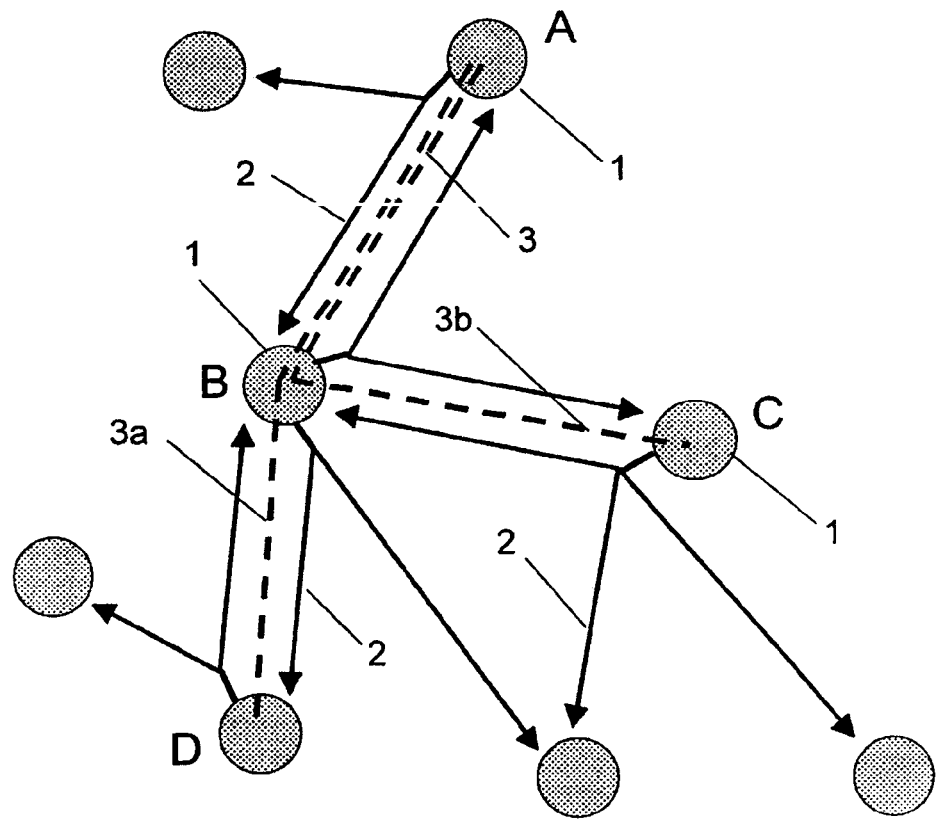

An example of an ad hoc radio network is shown in FIG. 2. It comprises, for example, a source node or ingress node Ne, several intermediate nodes Ni and an egress node Ns. The ad hoc network may be represented as a graph Gt consisting of a set of mobile nodes and all the connections (radio links in this case) existing between these nodes.

The radio links may be directional, using either access techniques such as TDMA techniques or sector antenna techniques known to those skilled in the art. The term "directional" designates the fact that a limited and controlled number of neighbors is linked up for radio propagation.

Each node comprises, for example, means that list the resources used to reach the neighboring nodes. For each type of resource (TDMA allocation, propagation channel, etc.), there are certain associated characteristics corresponding to the logic links. The characteristics may be required, for example, by an application.

The method according to the invention comprises a first step which structures the graph of the network in the form of a bi-directional point-to-point (unicast two-way) link in order to obtain all, or substantially all the links Ri,j existing between 2 Nodes Ni, Nj and to form sub-graphs during routing decisions, where the arcs of these sub-graphs connecting, for example, two nodes, share one and the same, or substantially the same set of properties. This step is executed for a given point in time. It may be done as follows:

In each mobile node, the "link supervision" entity periodically sends out packets containing inter alia:
The identity of the sender node $N_i$,
The list of the links $\{R_{ij}\}$ the neighboring nodes $N_j$, with their characteristics (two-way nature, available bit rate, packet loss rate, etc.).

Since each "link supervision" entity receives the packets described here above from the "link supervision" entities of the neighboring packets, it deduces all the neighboring nodes therefrom, as well as the available resources in order to exchange packets with them.

With the graph being determined, the method continues to be executed as described here below.

For a given application which must know a route leading from the source node to the egress node, the source node sends out a request that is broadcast to the other closest nodes. For a routing mechanism of the type available "on demand", during the route search phase, the route search requests are propagated only on the links belonging to the sub-graph complying with the properties requested by the application that has made use of the routing method. The response of the final node or egress node enables the route to be used for the transfer of information in the network to be made stable. A node memorizes, for example, only one route which corresponds to the route having the smallest number of hops among all the routes having the requested characteristics.

The characteristics of the logic links set up by the method comprise, for example:

- Performance levels that can be taken into account in additive metrics (time limits, jitter, etc.) to meet an end-to-end quality of service QoS of the network,
- Performance levels that can be taken into account in non-additive metrics (available bandwidth, maximum error rate, etc.),
- Levels of risk in terms of security,
- Inherited levels of longevity of the mobility of the nodes connected to each other and of the radio characteristics,
- Available energy levels such as administrative cost per class of traffic enabling the structuring of the ad hoc network,
- Levels compatible with the operational importance of the communications.

Typical groupings of combinations of values of these characteristics may be defined prior to the implementation of the method. Such a grouping of possible combinations of values is hereinafter called a "class of traffic".

For each class of traffic to be routed through the ad hoc network, the method defines sets of logic links complying with an operating profile. A major class of traffic may comprise one or more of the characteristics of the logic links listed here above.

If, for a given network at a given point in time, only the links having the characteristics defined for a certain set of traffic classes (such a set is called an "operating profile") is considered, then a sub-graph specialized for this operating profile is defined. This sub-graph is called a specialized virtual network.

The topology of these virtual networks varies firstly as a function of the radio connectivity varying with the mobility of the nodes and the random factors of propagation and, secondly, as a function of the values of characteristics varying with the traffic loads put through.

The computation of the values of characteristics associated with logic links therefore brings margins into play. These margins are all the smaller as the level of operational importance served is greater. The margins are fixed in taking account of the mobility of the network. This mobility should not bring the determined graph into question for an unimportant modification. The margins are, for example, chosen in order to anticipate the mobility of the network.

It will be noted that even if the radio graph is a connected graph, there may be virtual networks broken down into unconnected zones. Indeed, for two given nodes, it may be that there is no path connecting them while, at the same time, the only links used will be those that comply with a certain profile.

The method advantageously enables the elimination, at the earliest possible time and through routing failure, of packets that cannot be transported from end to end according to homogeneous criteria rather than the continuation of their transportation in the ad hoc network without meeting the constraints of streams to which they belong.

FIG. 2 gives a schematic view of the path traveled by the information within a distributed virtual network selected by the first node crossed of the ad hoc network or ingress node. This figure corresponds to an example of an operation in which:

- The application entity residing in the node 1 produces information packets to be addressed to the node 2.
- The application entity of the node 1 informs its desired routing entity that the packets are to be addressed to the node 2, and that they must be transferred in complying with certain QoS characteristics.

To carry out the routing of the information flowing in the network and in the intermediate nodes as a function of the selected virtual network, an information data characterizing the stream is introduced into the header of the packets by the ingress node Ne. This information expresses, for example, the quality of service as required by the application entity that had produced the packet.

This information is interpreted or translated by the intermediate nodes, namely the nodes 1 and 2. The initial information or information translated by the routing nodes is removed by the egress node. Each intermediate node has a predefined rule enabling it to deduce the virtual network from the information found in the header.

In short, the method executes at least the following steps:

a) the insertion of an information data (for example the quality of service QoS characteristics required by the application making a demand on the routing method) into the header of the packets by the source node or ingress node Ne, b) the interpreting or translating of the information by the intermediate nodes in order to comply with the constraint of the sub-graph adapted to the request from the application, c) at the egress node Ns, the removal of the information from the header.

Figure 3:
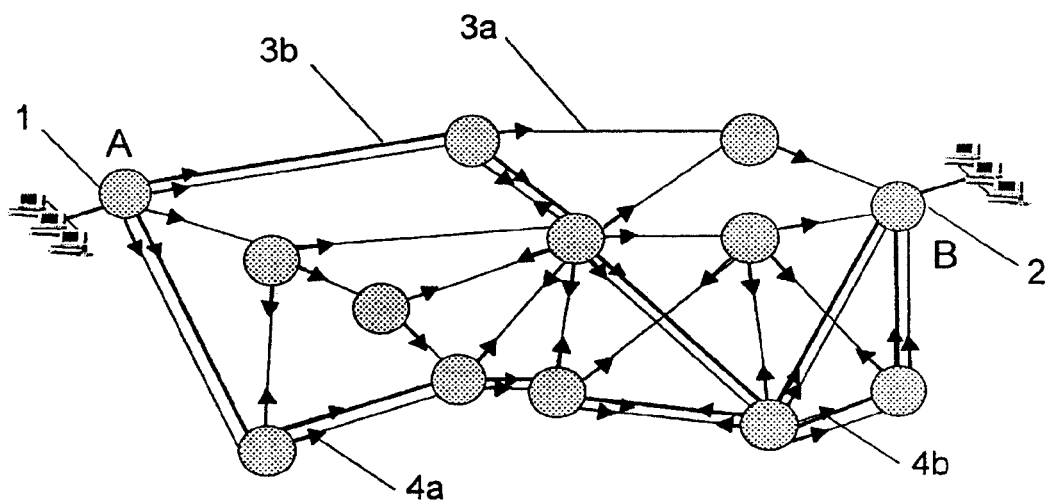
FIG. 3 is a diagram representing the ad hoc virtual networks, FIG. 4 exemplifies a change in topology of the ad hoc virtual networks, FIG. 5 exemplifies a graph with decoupling between the reservation of resources and dynamic routing in a virtual network.

FIG. 3 shows an example of variable topologies of sub-graphs according to the ability of the links of the full graph of the ad hoc network to put through the traffic with the performance levels and levels of operational importance associated with the sub-graph.

The connectivity of an ad hoc virtual network is more restricted than radio connectivity and varies according to the availability of the resources. Depending on the loads and random factors in propagation, a radio link may be suited to a virtual network designated as "a" in the figure, but may no longer be suited to a virtual network designated as "b" in the figure.

According to one alternative embodiment, at a given node, the method comprises a step of comparison between the properties of the communications resources existing between this node and the expected properties of the links of the sub-graph considered and the creation or breaking of the logic links depending on whether or not the observed properties correspond to those expected. During the comparison of the characteristic values defining the properties, a predefined margin is applied. For a given characteristic, the margin may be different from one sub-graph to another.

The additional instability introduced by the fact of the break in links is compensated for by a structuring of the traffic in the ad hoc network leading to an improved use of the resources and hence long-term stability necessary for the passage of the stream with a quality of service (compliance with time-related, error rate and loss rate parameters).

The logic links of different virtual networks share the same radio links between two nodes.

This sharing pools resources. The policies of assigning these resources will introduce an interaction between the logic links of the different virtual networks.

In the event of congestion, the ordering of the streams or the reservation of the resources made at each intermediate node confirms this choice by the implementation of packet-transportation priorities and resource pre-emption. At a node, if the method detects congestion, it implements policies of scheduling and pre-emption which, depending on priorities of data transportation required by the applications, define the possibilities of assigning resources to serve one individual stream to the detriment of another stream. These possibilities of assignment may be done, as the case may be, to the detriment of one sub-graph in favor of another sub-graph.

The logic links of the different virtual networks having equivalent operational importance are maintained between two adjacent nodes so long as the availability of resources is compatible with the virtual network performance characteristics. The levels of resources required are different according to these performance characteristics.

Thus, a logic link of a virtual network associated with a "best effort" service will be kept so long as radio connectivity is ensured, while a logic link of a virtual network dedicated to the real-time service will be kept only if radio connectivity offers an available bit rate ensuring the flow of real-time streams.

Figure 4:
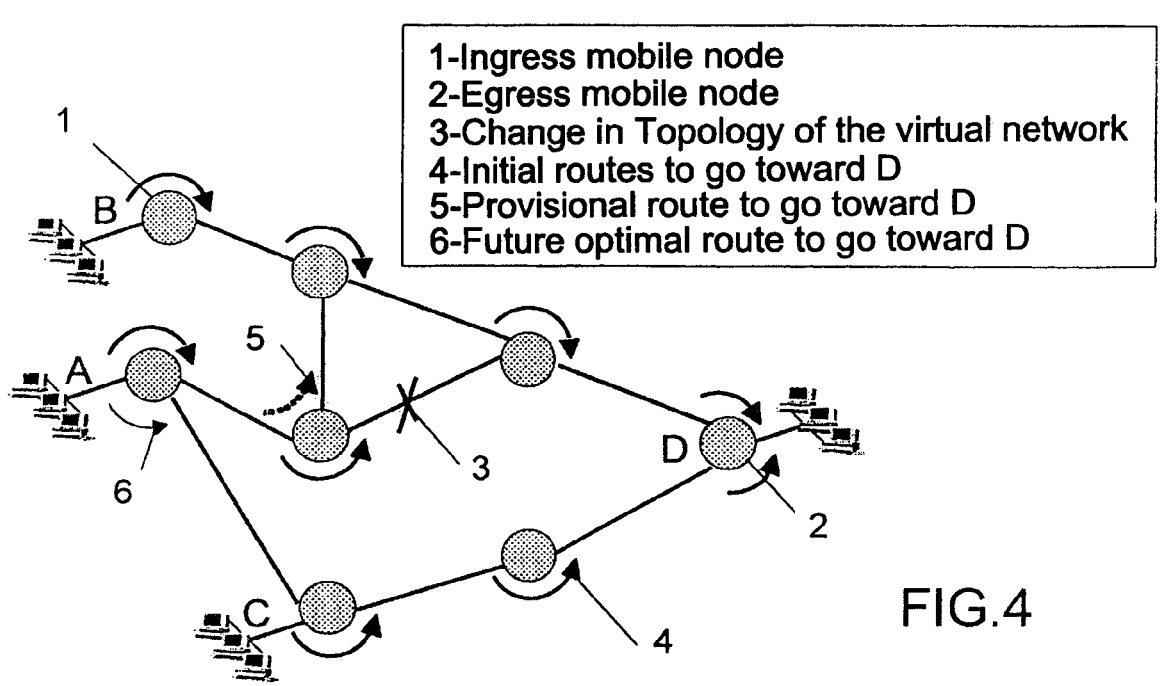
Figure 5:
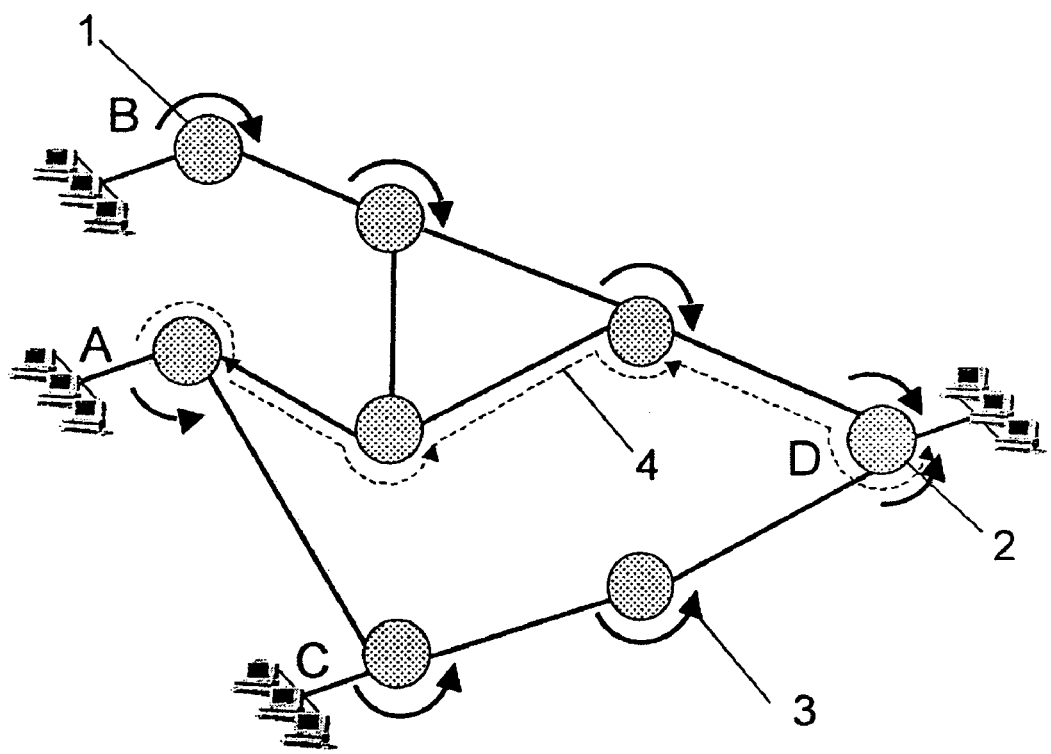

FIG. 4 is a drawing of a graph comprising static routes selected in a sub-graph at a given point in time in order to enable the end-to-end control of its QoS or quality of service characteristics and their association them with reservations of resources.

The method enables the use of an additional mechanism, when the stream constraints to be complied with from end to end require it, to complement the selection of a route by a reservation of resources.

The reservation of resources is done along a selected active route in a virtual network "a" in making the route static. Thereafter, the virtual network "a" may evolve, and the dynamic routing may set up other optimum routes. The static route is not modified so long as the reservations of resources made for it are kept (it is separated from the subsequent route computations).

A reservation of resources along a route selected by a dynamic distributed routing using QoS-oriented metrics introduces high instability. The reservation of resources is done, for example, hop by hop in an ad hoc network in a distributed way (the centralized mechanisms are not applicable in an ad hoc network) in following a route in one of the virtual networks. The virtual network approach enables the performance of these reservations preferably on virtual networks characterized by their stability.

By way of an example, the conveyed information packets that undergo a reservation of resources may be IP packets, and the ingress node uses an IP-in-IP encapsulation to designate the next intermediate node in the header of the IP packet. The following intermediate nodes may interpret or translate this header and in turn designate the next node. The IP packets are de-encapsulated by the egress node so as to retrieve the final destination address in the IP header.

Other techniques such as MPLS encapsulation or encapsulation specific to radio access layers may also be used.

The routing method relies on availabilities of resources along virtual network logic links. The method with reservation of resources proceeds, in the case of congestion (availability left insufficient) to release resources reserved for streams of lower operational importance. These cases of congestion appear either at the time of reservation owing to concurrent reservations or after the reservation during a modification of the characteristics of the radio links (due to mobility and random factors of propagation).

A reservation of resources modifies the availability of the resources in a set of logic links: all the links share the same radio links as the logic links of the virtual network in which the reservation has been made.

The topology of the virtual networks will therefore get modified in leaving the static routes unchanged and orienting the new stream flow requests to other routes. To bring the system back to a state of optimum equilibrium when the reservations are released, an additional mechanism enables the re-fixing of the reservations on the shortest route by comparing the number of hops of a static route with the number of hops on the dynamic route.

Exemplary Application of the Method for Routing Using the AODV Protocol

The following example is given for the application of the method according to the invention to the AODV protocol which is defined in the RFC 3561 of the IETF. This protocol is re-used by appending the novel functions of the routing method adopted by a particular addressing principle, a particular configuration of routing parameters and modifications in the flooding procedure for route searching and responses to these route search requests. The method uses, for example, the parameter corresponding to the "destination address" of the AODV PDUs to convey the quality of service characteristics.

These modifications are made in such a way that subsequent progress in the AODV protocol by future RFCs of the IETF (amendment for processing multiple paths or QoS parameters) can also benefit the adopted routing method.

A—Use of Four-byte Address Fields of the AODV PDUs

A seen AODV address will take the form IPv4 and will be constituted by a concatenation of five fields:

| Byte 1 (IPv4) | Byte 2 (IPv4) | Byte 3 (IPv4) | Byte 4 (IPv4) |
|---|---|---|---|
| Multicast-Unicast deployment | PRIO | COS  BW | Node identifier |

An eight-bit "deployment and address class" field is used to set up broadcast, multicast addresses and facilitate interoperability in the case of mutual help.

The code "10" will be applied to the unicast addresses of the microstreams traveling through the ad hoc radio system and code "11" will be applied to the unicast addresses used for the internal requirements of the ad hoc radio system (signaling, management).

A three-bit "PRIO" field used to differentiate operational importance. This latter case will be described in greater detail with respect to flooding and response mechanisms.

A four-bit "CoS" field is used to set up 16 categories of service of the ad hoc radio system. These "level 2" classes of service should not be confused with the DiffServ fields of the IP packets transported. They characterize 16 forms of HC behavior which are not necessarily in a one-to-one relation with the DiffServ classes defined for the IP packets (IETF).

The correspondence is done by the peripheral functions according to rules proper to the type of convergence function located on the periphery.

A "BW" field characterizes a bit rate class encoded on two bits. A 14-bit "Ad hoc radio MAC" field designates the radio target station. This address format is used in all the AODV PDUs.

A target station is therefore seen by several addresses. This simple principle is used to maintain several routes according to distinct traffic requirements.

B—Interface Topology

The routing function on each node awaits reception of the list of neighbors at one hop that can be attained from the local topology management function.

The AODV Hello procedures will therefore not be activated.

A "Management of Availability" function builds the list of usable virtual interfaces. These virtual interfaces are:
- either interfaces with a unicast link and, in this case, the management of availability function provides the attributes: identity of the neighboring station, maximum usable bit rate and, for each service category, the authorized bit rate proportion,
- or interfaces with a multicast link and, in this case, the management of availability function gives the list of the reachable neighboring stations; these interfaces will not be used for the unicast data transfer service.

The AODV protocol does not form a policy routing base. The encapsulation will therefore force AODV to work on sub-graphs in filtering route search propagation.

A sub-graph is selected as a function of the "PRIO", "CoS" and "BW" address fields. This selection is made by the management of availability function which comes into play during the reception of a route search for filtering or not filtering depending on the membership of the virtual interface in the sub-graph considered.

C—Floods and Responses

The AODV PDUs sent on the logic routing interfaces are encapsulated hop-by-hop by a UDP protocol where the IP addresses are in the technical addressing plane implicitly designating the virtual interfaces.

When these PDUs are broadcast in the vicinity of a hop, the destination addressing used will be 255.255.255.255.

When these PDUs are sent in unicast mode, the destination addressing used will take the following form:

| Byte 1 (IPv4) | Byte 2 (IPv4) | Byte 3 (IPv4) | Byte 4 (IPv4) |
|---|---|---|---|
| Multicast-Unicast deployment | PRIO | INTF | Station identifier |

The six-bit INTF field designates the egress virtual interface. The source addresses will also take this shape, but the INTF field will be set at zero value.

The AODV PDUs may contain original addresses of the request and the address of the target destination in the data part of the PDU. These addresses, as indicated here above in §A, contain the totality of the FEC field. It must be noted that the original address has the FEC parameters of the target so as to have a perfectly symmetrical sub-graph.

To introduce a notion of the sub-graph while, at the same time, retaining the advantages of the one-hop broadcast, the messages propagated in a broadcast limited to one hop (255.255.255.255) will be transmitted by appending the list of authorized interfaces (designated by the identifier of the sender station and the egress interface number) to the initial AODV PDU.

When a propagated message of this kind is received, a filter is placed on the interface to reject all the messages not addressed to an ingress interface of the station.

In the case of the propagation of the RREQ PDU, the routing function interrogates the "management of availability" function to ensure that the availabilities on the upstream and downstream interfaces are compatible with the targeted FEC parameters which appear in the content of the PDU.

This simple principle makes it possible to constitute routes with differentiated behavior, each being the shortest route in a given sub-graph.

In each station, a route is identified by the target address which explicitly designates the sub-graph. A list of upstream stations using this route is attached to it.

D—Routing of Next Hop

The PDUs to be routed by the packet processing function follow the AODV route that enables an FEC to be reached.

The routing function therefore gives the address of the next hop, namely the IP address of the logic interface enabling this next hop. This IP address follows the addressing rules described here above and therefore contains the identifier of the interface. An unused route is invalidated after a period of inactivity.

This mechanism is implemented by the packet processing function and configured by the routing function.

E—Supervision of Routes

The management of availability function is responsible for verifying the availabilities of the downstream virtual interfaces and the connectivity of the neighbors through these interfaces.

An active route is supervised: each modification reported by the management of availability function is analyzed from the table of active routes. When a modification of topology has an impact on an active route, the route is invalidated.

When a route is invalidated on an intermediate station, an RERR message is sent to the upstream stations using this route. This message is propagated successively by the intermediate stations to reach the original stations of the route.

A route search is relaunched by the original stations.

When an intermediate station detecting the route break is close to the destination station, a route search is launched from this intermediate station.

Encapsulation of a Reservation Protocol

The LDP protocol is defined by the RFC 3036 of the IETF. This protection is re-used by the appending to it of the novel functions for resource reservation and for making a route static according to the routing method adopted.

A static route is designated by the acronym LSP (Label Switched Path).

A—Identification of an LSP

An LSP is identified by the station of origin. The identifier is unique in the system: one part is the identifier of the original station, while the other is a number assigned by the original station. This identifier is conveyed in all the LSP management messages. It is given to the routing function and is not modified in cases of LSP reconfiguration.

B—Assigning of the Switching Labels

The switching labels are assigned by each downstream station. They are taken during a message for setting up the LSP from upstream to downstream and given to the upstream station during the confirmation message from downstream to upstream. These labels are assigned in the context of a virtual interface.

C—Hop-by-hop Reservations

The LDP protocol in the ad hoc radio system is only one means of exchanging LSP management messages.

The ad hoc radio needs are therefore simplified relative to an MPLS system.

All the radio stations implement a simplified LDP protocol. The topology is conducted by the management of availabilities function. The LDP discovery procedures are therefore deactivated.

D—Reconfiguration of LSP

An LSP can be reconfigured from its point of origin in produced versions. This reconfiguration could rely on principles given by the RFC 3214. They could come into play during rearrangements to decongest the ad hoc radio system in bringing the established LSPs to routes that are shorter in terms of hops.

What is claimed is:

1. A method of routing information in a network having several communication nodes that may be mobile, the routing being done on a route between a source node and a destination node through a set of wireless communication links between the network nodes, the method comprising steps of:
    structuring a graph in each mobile node, by a link supervision entity on each mobile node, in a form of a bidirectional point-to-point (unicast two-way) link, obtaining substantially all the links Ri,j existing between two nodes Ni and Nj and to form sub-graphs during routing decisions, wherein arcs of these sub-graphs connecting two nodes, substantially share a same set of properties;
    transmitting periodically, by the link supervision entity, packets including:
        an identity of a sender node Ni; and
        a list of the links Ri,j with neighboring node Nj, with characteristics of the links Ri,j;
    receiving, by each link supervision entity, the transmitted packets;
    determining, by each link supervision entity, all neighboring nodes in addition to any available communication resources in order to exchange packets therewith
    transmitting, by a transport entity distributed on each node, information from the source node to the destination node as a function of a sub-graph selected by the source node; and
    comparing, at a given node, the properties of the communications communication resources existing between this the given node and the expected properties of the links of the sub-graph considered and creating or breaking the logic links depending on whether or not the observed properties correspond to those expected.

2. The method according to claim 1, wherein the routing mechanism is of the on demand type and, during a phase of searching for a route, comprises propagating route requests only on links belonging to the sub-graph having the properties requested by the application that has made a call on the routing method.

3. The method according to claim 1, wherein transmitting information includes transmitting information packets, the method further comprising:
    inserting quality of service QoS characteristics, required by the application making a call on the routing method, into a header of the packets by the source node or ingress node Ne,
    interpreting or translating the information by intermediate nodes in order to route the information packet flowing in the network in compliance with the constraint of the sub-graph adapted to the request from the application, and
    removing, at the egress node Ns, the information from the header.

4. The method according to claim 1, wherein, comparing the properties of the existing communication resources of the given node and the expected properties of the links includes applying a predefined margin by which the values being compared may differ.

5. The method according to claim 1, wherein, at a node, congestion is detected and policies of scheduling and pre-emption are implemented which, depending on priorities of data transportation required by the applications, define the possibilities of assigning resources to serve one individual stream to the detriment of another stream or to the detriment of one sub-graph in favor of another sub-graph.

6. The method according to claim 1, comprising a step of hop-by-hop resource reservation in a network in order to make a route static and separate from the evolution of the sub-graphs.

7. The routing method according to claim 1, performing a route search on demand applying a routing protocol.

8. The method according to claim 7, wherein the protocol is an AODV protocol.

9. The method according to claim 8, wherein the destination address parameter of the AODV PDUs is used to convey the quality of service or QoS characteristics.

10. The method according to claim 2, wherein transmitting information includes transmitting packets and comprises:
    inserting quality of service QoS characteristics required by the application making a call on the routing method, into the header of the packets by the source node or ingress node Ne,
    interpreting or translating the information by the intermediate nodes in order to route the information packet flowing in the network in compliance with the constraint of the sub-graph adapted to the request from the application, and
    at the egress node Ns, removing the information from the header.

11. The method according to claim 10, wherein, during the comparing of characteristic values defining the properties, a predefined margin is applied.

12. The method according to claim 10, further comprising detecting congestion at a node, and implementing policies of scheduling and pre-emption that depending on priorities of data transportation required by the applications, define the possibilities of assigning resources to serve one individual stream to the detriment of another stream or to the detriment of one sub-graph in favor of another sub-graph.

13. The method according to claim 10, comprising a step of hop-by-hop resource reservation in a network in order to make a route static and separate from the evolution of the sub-graphs.

14. The method according to claim 2, comprising a step of hop-by-hop resource reservation in a network in order to make a route static and separate from the evolution of the sub-graphs.

15. The method according to claim 3, comprising a step of hop-by-hop resource reservation in a network in order to make a route static and separate from the evolution of the sub-graphs.

* * * * *